United States Patent
Gotoh (10) Patent No.: US 7,269,688 B2
(45) Date of Patent: Sep. 11, 2007

(54) METHOD OF CREATING AND RECORDING IMAGE FILE

(75) Inventor: Hiroshi Gotoh, Kanagawa (JP)

(73) Assignee: Ricoh Company, Ltd. (JP)

( * ) Notice: Subject to any disclaimer, the term of this patent is extended or adjusted under 35 U.S.C. 154(b) by 348 days.

(21) Appl. No.: 10/767,372

(22) Filed: Jan. 30, 2004

(65) Prior Publication Data

US 2004/0186954 A1 Sep. 23, 2004

(30) Foreign Application Priority Data

Feb. 4, 2003 (JP) .............................. 2003-027044

(51) Int. Cl.
*G06F 12/00* (2006.01)

(52) U.S. Cl. .......................................... 711/112; 707/6
(58) Field of Classification Search ................ 711/112
See application file for complete search history.

(56) References Cited

U.S. PATENT DOCUMENTS

| | | | |
|---|---|---|---|
| 6,119,132 A * | 9/2000 | Kuwano | 707/205 |
| 6,788,346 B2 * | 9/2004 | Ito et al. | 348/372 |
| 6,904,229 B1 * | 6/2005 | Suzuki et al. | 386/95 |
| 2003/0113103 A1 * | 6/2003 | Kahu | 386/95 |
| 2003/0117921 A1 | 6/2003 | Gotoh | |
| 2003/0133368 A1 | 7/2003 | Gotoh et al. | |
| 2004/0003314 A1 * | 1/2004 | Witt et al. | 714/6 |

* cited by examiner

*Primary Examiner*—Brian R. Peugh
*Assistant Examiner*—Hashem Farrokh
(74) *Attorney, Agent, or Firm*—Dickstein Shapiro LLP (57) ABSTRACT

A method of creating an image file to be additionally written is disclosed to prevent logical inconsistency between the image file and existing recorded data in a target information recording medium. The method of creating an image file of target information to be additionally written in an information recording medium includes: a first step of creating image data of the target information; a second step of obtaining identification information of the information recording medium; and a third step of creating an image file having the image data in association with the identification information.

5 Claims, 9 Drawing Sheets

| RECORD NUMBER | FILE NAME | IDENTIFICATION INFORMATION |
|---|---|---|
| 1 | file01 | Volume01200212251425 |
| 2 | file02 | Volume02200212280840 |
| 3 | file03 | Volume03200301041200 |

FIG.9B

| RECORD NUMBER | FILE NAME | IDENTIFICATION INFORMATION |
|---|---|---|
| 1 | file01 | Volume01200212251425 |
| 2 | file02 | Volume02200212280840 |
| 3 | file03 | Volume03200301041200 |
| 4 | file04 | Volume04200301241500 |

METHOD OF CREATING AND RECORDING IMAGE FILE

BACKGROUND OF THE INVENTION

1. Field of the Invention

The present invention generally relates to a method of creating and recording an image file and an information recording system, and more particularly to a method of creating an image file to be additionally written in an information recording medium, a method of additionally writing such an image file in an information recording medium, an information recording system having an information recording device and an information processing device, and an information recording medium for storing a program for such an information recording system.

2. Description of the Related Art

Recent technological advances in personal computers (PC) makes it possible to process audio-visual information such as audio information and video information. In general, such audio-visual information includes an enormous amount of data. Thus, there is an increasing interest in CD (Compact Disc) and DVD (Digital Versatile Disc) as high-capacity information recording media for storing audio-visual information. In addition, as optical disk devices become more affordable, the optical disk devices have been more widely used as information recording devices to record information in optical disks.

For example, when user data are recorded in CD-R (CD-Recordable), installed mastering application software (hereinafter which is referred to as "writer software") is used in general. Conventionally such writer software temporarily creates image data including user data and directory information thereof in a hard disk, and then records the created image data in CD-R. In this case, after recording the image data in CD-R, the image data are automatically deleted from the hard disk.

A conventional multisession recording approach, which is one of recording technologies for CD-R, allows information to be additionally written per session. For example, in order to additionally write user data in CD-R containing at least one session, conventional writer software executes the following steps:

1. Read file management information having session volume information recorded in a predetermined area in target CD-R and logical structure information on file data;
2. Attach file information on the target user data, which will be additionally written, to the file management information to establish links between the target user data and existing recorded data;
3. Create image data having updated file management information and the target data in a hard disk;
4. Additionally write the created image data in CD-R; and
5. Delete the image data from the hard disk.

In recent years, writer software that can create an image file from image data (hereinafter which is referred to as a "filing function") and then store the created image file in a hard disk has been available. For example, if a user created an image file from image data and stored the image file in a hard disk before, the user can use such writer software to record the image file on CD-R later.

However, such conventional filing function can record data in only a blank disk. In other words, conventional writer software cannot additionally write data in a non-blank disk. As mentioned above, if image data are multisession recorded, the image data includes file management information. Thus, when the image data are additionally written in another CD-R different from CD-R used in image data creation, logical consistency between the image data and existing data in the different CD-R can fail. As a result, there is a risk that some problems may be caused. For example, although CD-R includes the image data, the image data cannot be accessed. Also, when a user attempts to access the image data, the system is crashed.

SUMMARY OF THE INVENTION

It is a general object of the present invention to provide a method of creating an image file creation method, a method of recording an image file and an information recording system in which one or more of the above-mentioned problems are eliminated.

A first more specific object of the present invention is to provide a method of creating an image file for target data to be additionally written without logical inconsistency between the image file and existing recorded data.

A second more specific object of the present invention is to provide a program for an information recording system having an information recording device and an information processing device without logical inconsistency between the image file and existing recorded data, and a recoding medium for storing the program.

A third more specific object of the present invention is to provide a method of additionally writing data and an information recording system without logical inconsistency between the image file and existing recorded data.

In order to achieve the above-mentioned objects, there is provided according to one aspect of the present invention a method of creating an image file of target information to be additionally written in an information recording medium, including: a first step of creating image data of the target information; a second step of obtaining identification information of the information recording medium; and a third step of creating an image file having the image data in association with the identification information.

According to one aspect of the present invention, for example, if a created image file is additionally written later, it is possible to determine whether the image file can be additionally written in an information recording medium without logical inconsistency between the image file and existing data recorded in the information recording medium by referring to identification information associated with the image file before execution of the additionally write operation. As a result, it is possible to prevent such logical inconsistency between the image file and the existing recorded data.

Additionally, there is provided according to another aspect of the present invention a method of additionally writing image data included in an image file in an information recording medium, including: a first step of obtaining identification information of the information recording medium; a second step of determining whether the identification information of the information recording medium and identification information associated with the image file are the same; and a third step of, only if the identification information of the information recording medium and the identification information associated with the image file are the same based on the determination, additionally writing the image data included in the image file in the information recording medium.

According to one aspect of the present invention, identification information associated with a target image file is referred to before execution of the additionally write operation, and only if the associated identification information and identification information of a target information recording medium are the same, the image file is allowed to be additionally written in the information recording medium. As a result, it is possible to additionally write the image file without logical inconsistency between the image file and existing recorded data.

Additionally, there is provided according to another aspect of the present invention an information recording system for recording information in an information recording medium, including: an information processing device having a file creation part, in response to a request to create an image file of target information to be additionally written in an information recording medium, creating an image file including image data of the target information in association with identification information of the information recording medium; and an information recording device, in response to a recording request from the information processing device, recording the target information in the information recording medium.

According to one aspect of the present invention, for example, if a created image file is additionally written later, it is possible to prevent illegal installation of an unsuitable information recording medium other than specific information recording media into an information recording device without logical inconsistency between the image file and existing data recorded in the information recording medium by referring to identification information associated with the image file before execution of the additionally write operation. As a result, it is possible to prevent such logical inconsistency between the image file and the existing recorded data.

Other objects, features and advantages of the present invention will become more apparent from the following detailed description when read in conjunction with the accompanying drawings.

DETAILED DESCRIPTION OF THE PREFERRED EMBODIMENTS

In the following, embodiments of the present invention will be described with reference to the accompanying drawings.

A first embodiment of the present invention is described with reference to FIG. 1 through FIG. 4.

Figure 1:
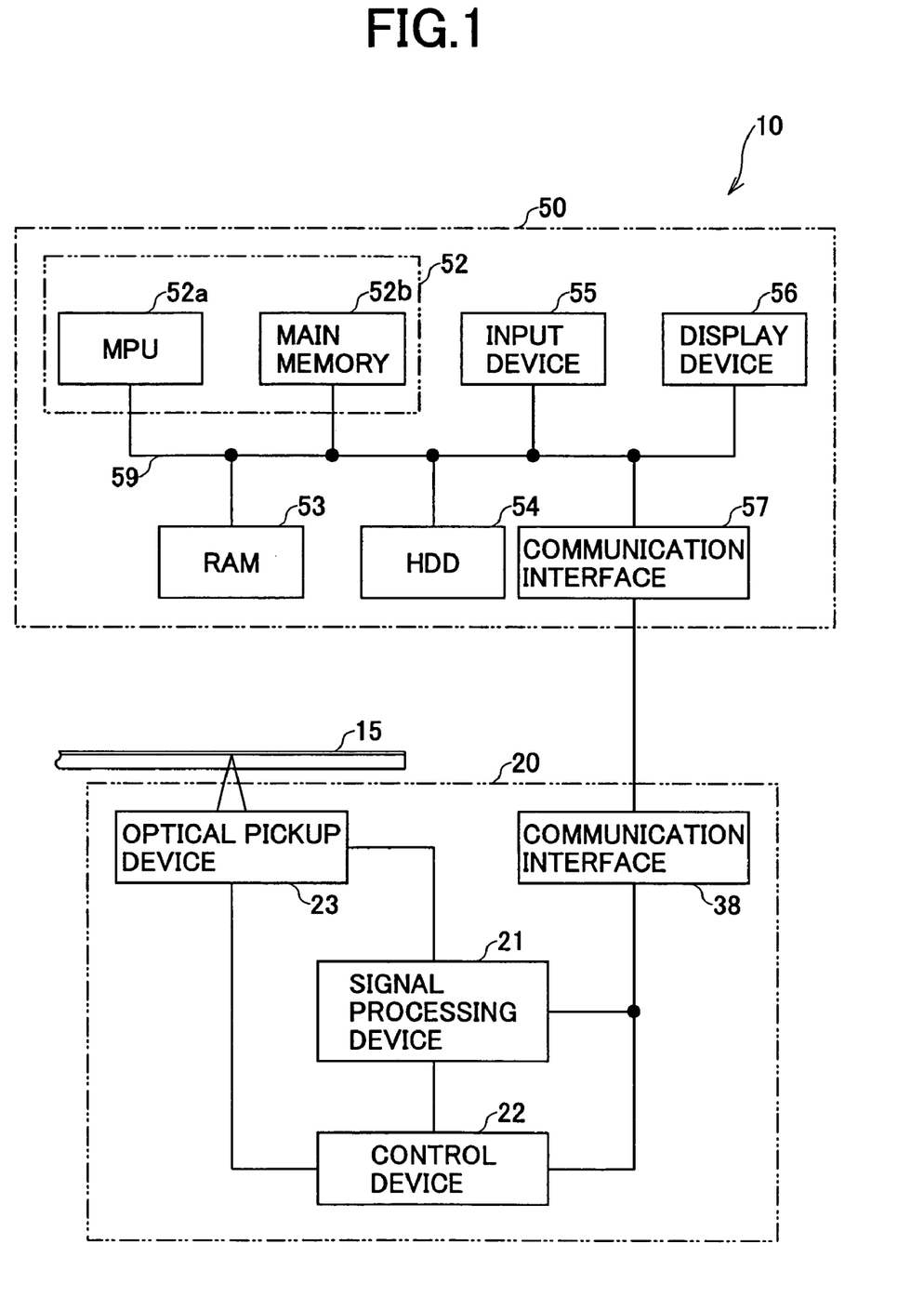
FIG. 1 shows an exemplary structure of an information recording system according to a first embodiment of the present invention.

FIG. 1 shows an exemplary structure of an information recording system 10 according to the first embodiment of the present invention.

Referring to FIG. 1, the information recording system 10 includes an optical disk device 20 as an information recording device and a host 50 as an information processing device to control the optical disk device 20. It is noted that illustrated connection lines (solid lines) do not represent all connections between individual blocks. The connection lines are focused on main flow of signals and information.

The optical disk device 20 includes an optical pickup device 23, a signal processing device 21, a control device 22 and a communication interface 38. The optical pickup device 23 emits a laser ray toward a recorded surface, on which spiral or concentric tracks (recording area) are formed, of an optical disk 15 as an information recording medium. At the same time, the optical pickup device 23 receives light reflected from the recorded surface. The signal processing device 21 extracts various kinds of information from output signals supplied from the optical pickup device 23 to generate write signals corresponding to data to be recorded in the optical disk 15. The generated write signals are supplied back to the optical pickup device 23. The communication interface 38 is a bidirectional communication interface between the optical disk device 20 and the host 50. The communication interface 38 is compliant with a standard interface such as ATAPI (AT Attachment Packet Interface), SCSI (Small Computer System Interface) and USB (Universal Serial Bus). The control device 22 controls the optical disk device 20 based on instructions issued by the host 50. In this embodiment, a CD-R (Compact Disk-Recordable) information recording medium is used as the optical disk 15. Also, an ISO9660 compliant file system is used in this embodiment.

On the other hand, the host 50 includes a main control device 52, RAM (Random Access Memory) 53, a hard disk (HDD) 54 as a recording medium, an input device 55, a display device 56 and a communication interface 57. These components are connected to each other via a common bus 59.

The main control device 52 includes a microcomputer (MPU) 52a and a main memory 52b. The main control device 52 controls the host 50 and temporarily stores some data required to control the host 50 into RAM 53.

The communication interface 57 is a communication interface in compliance with the same standard as the communication interface 38 of the optical disk device 20. The communication interface 57 is connected to the communication interface 38. Here, the communication interfaces 38 and 57 may be connected via a communication cable such as a SCSI cable. Alternatively, the communication interface 38 and 57 may be connected in wireless such as infrared communication.

HDD 54 includes programs described in codes that MPU 52a can read. A program to create an image file of user data in response to an image file creation request (hereinafter which is referred to as an "image file creation program") is stored in HDD 54. Also, a program to additionally write an image file in the optical disk 15 in response to an image file additionally write request (hereinafter which is referred to as an "image file additionally write program") is stored in HDD 54. In addition, a plurality of user data files are stored in HDD 54.

The display device 56 includes a display part (not illustrated) such as CRT (Cathode Ray Tube), LCD (Liquid Crystal Display) and PDP (Plasma Display Panel). The display device 56 displays information supplied from the main control device 52.

The input device 55 includes at least one input medium (not illustrated) such as a keyboard, a mouse, a tablet, a trackball, a stylus pen and a touch panel. The input device 55 supplies user's input information to MPU 52a. Here, such input information may be wireless supplied from an input medium. Alternatively, a touch panel attached CRT, which integrally contains the display device 56 and the input device 55, may be used as the input device 55.

An exemplary image file creation operation to create an image file of user data according to the first embodiment is described with reference to FIG. 2 and FIG. 3.

Figure 2:
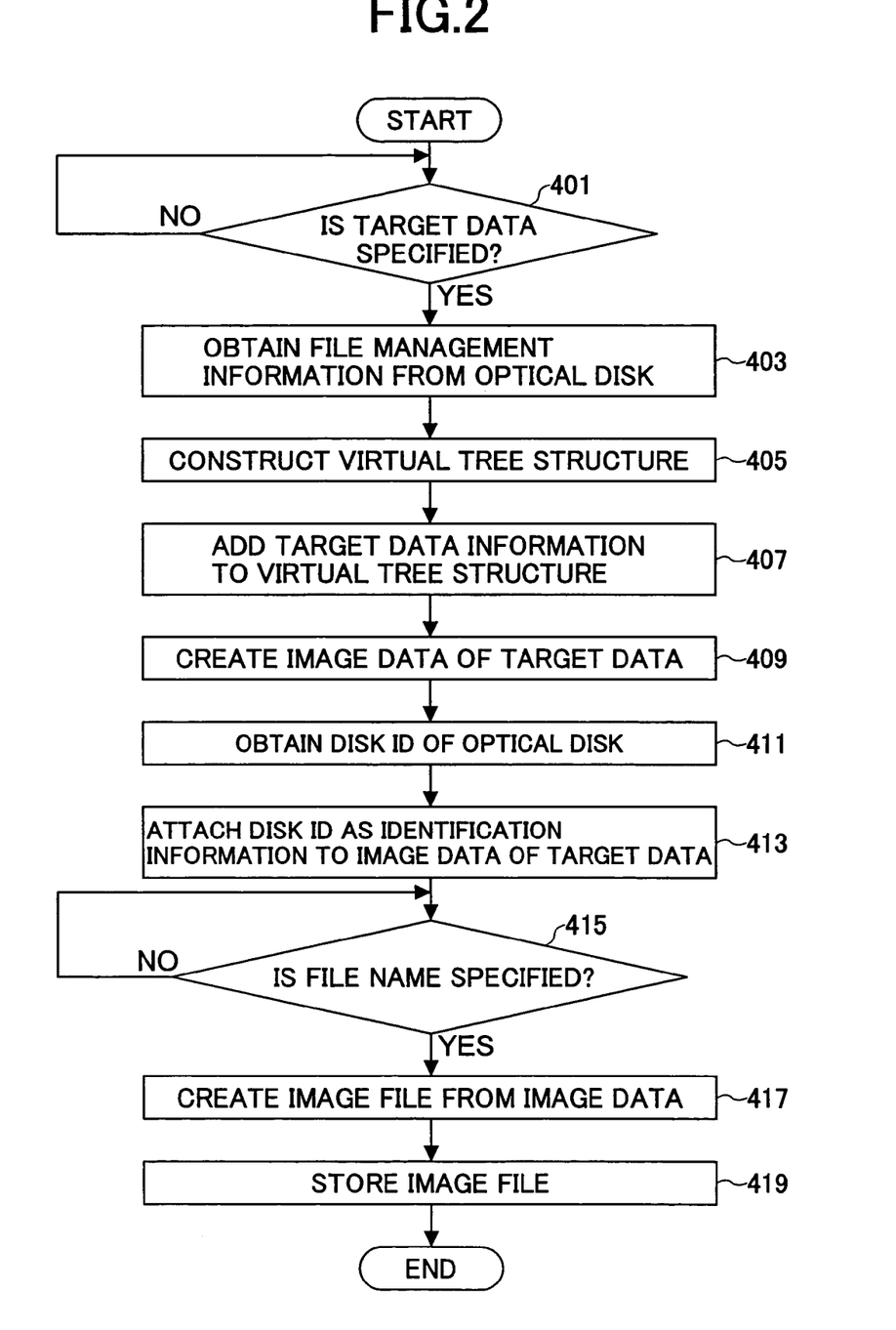
FIG. 2 is a flowchart of an image file creation operation according to the first embodiment.

FIG. 2 is a flowchart of an image file creation operation executed by MPU 52a of the information recording system 10 according to the first embodiment. FIG. 3 is a diagram to explain an exemplary image file created in accordance with the image file creation operation shown in FIG. 2.

Referring to FIG. 2, in response to an instruction to create an image file from a user via the input device 55, a program implementing the image file creation operation in shown in FIG. 2 is loaded from HDD 54 to the main memory 52b. Then, the head address thereof is set in a program counter of the MPU 52a, and the image file creation operation is started. In this embodiment, data are recorded in the optical disk 15 in a multisession fashion. It is supposed that the optical disk 15 already contains at least one session. In addition, it is supposed that a new session can be additionally written in the optical disk 15.

At step 401, MPU 52a determines whether user data to be recorded in the optical disk 15 (hereinafter which are referred to as "target data") are specified. If the target data are not specified, MPU 52a displays on the display device 56 a message to prompt the user to designate the target data. When the user determines one of a plurality of user data files stored in HDD 54 as the target data and designates the target data via the input device 55, MPU 52a determines that the target data have been specified at step 401, and the process control proceeds to step 403. Here, for example, if the host 50 is connected to a network, the user can select user data located in the network as target data.

At step 403, MPU 52a reads file management information from a predetermined position of the optical disk 15 via the optical disk device 20. Here, the file management information includes pointer information indicative of recorded positions of user data in the optical disk 15.

At step 405, based on the read file management information, MPU 52a constructs a virtual tree structure indicative of logical relationship of the user data in RAM 53.

At step 407, by adding information regarding the target data in the tree structure, MPU 52a constructs an updated tree structure.

At step 409, MPU 52a creates image data of the target data based on the updated tree structure and stores the created image data in HDD 54.

At step 411, MPU 52a reads a disk ID recorded at a predetermined position IN the optical disk 15 via the optical disk device 20. In this embodiment, the disk ID is configured as 4-byte data.

Figure 3:
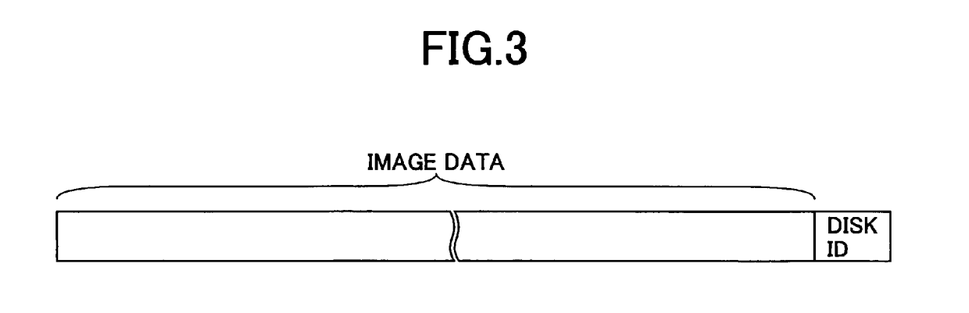
FIG. 3 is a diagram to explain an exemplary image file created in accordance with the image file creation operation shown in FIG. 2.

At step 413, MPU 52a adds the disk ID as identification information in an end portion of the image data of the target data in HDD 54, as illustrated in FIG. 3.

At step 415, MPU 52a determines whether the file name of the image data of the identification information attached target data is specified. If the file name is not specified, MPU 52a displays on the display device 56 a message to prompt the user to designate the file name. Then, if the user supplies the file name via the input device 55, MPU 52a determines that the file name has been determined. Then, the process control proceeds to step 417.

At step 417, MPU 52a creates an image file having the specified file name from the image data of the identification information attached target data.

At step 419, MPU 52a stores the created image file in HDD 54 and terminates the image file creation operation.

An image file additionally write operation to additionally write an image file in the optical disk 15 according to the first embodiment is described with reference to FIG. 4.

Figure 4:
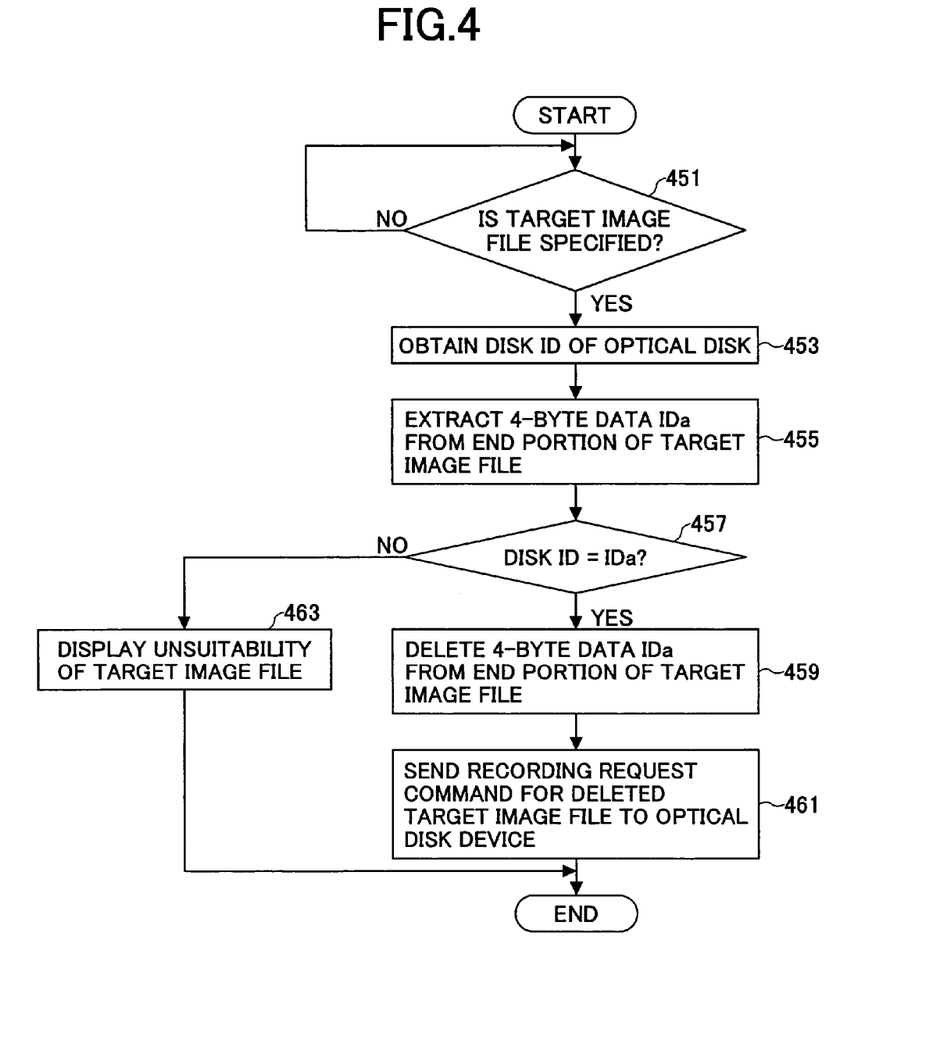
FIG. 4 is a flowchart of an image file additionally write operation according to the first embodiment.

FIG. 4 is a flowchart of an image file additionally write operation executed by MPU 52a of the information recording system 10 according to the first embodiment.

Referring to FIG. 4, in response to an instruction to additionally write an image file from a user via the input device 55, a program implementing the image file additionally write operation shown in FIG. 4 is loaded from HDD 54 to the main memory 52b. Then, the head address thereof is set in a program counter of the MPU 52a, and the image file additionally write operation is started. In this embodiment, it is supposed that a plurality of image files created in the above-mentioned image file creation operation are stored in HDD 54.

At step 451, MPU 52a determines whether an image file to be recorded in the optical disk 15 (hereinafter which are referred to as a "target image file") is specified. If the target image file is not specified, MPU 52a displays on the display device 56 a message to prompt the user to designate the target image file. When the user determines one of a plurality of image files stored in HDD 54 as the target image file and designates the target image file via the input device 55, MPU 52a determines that the target image file has been specified at step 401, and the process control proceeds to step 453.

At step 453, MPU 52a reads the disk ID of the optical disk 15 from a predetermined position in the optical disk 15 via the optical disk device 20.

At step 455, MPU 52a reads the target image file from HDD 54, and then extracts 4-byte data (IDa) from an end portion of the target image file.

At step 457, MPU 52a determines whether the disk ID of the optical disk 15 and the 4-byte data IDa are the same. If the disk ID and the data IDa are the same, the process control proceeds to step 459.

At step 459, the 4-byte data IDa are deleted from the end portion of the target image file.

At step 461, MPU 52a sends to the optical disk device 20 a recording request command to record the deleted target image file. As a result, it is possible to additionally write the target image file in the optical disk 15 via the optical disk device 20. Then, MPU 52a terminates the image file additionally write operation.

On the other hand, if the disk ID of the optical disk 15 and the data IDa are not the same at step 457, the process control proceeds to step 463.

At step 463, MPU 52a displays on the display device 56 a message to indicate that the target image file is not suitable for the optical disk 15. Then, MPU 52a terminates the image file additionally write operation. Thus, the target image file is not additionally written in the optical disk 15.

From the above description, it will be understood that a file creation part, a storage part, a determination part and an additionally write request part are implemented by MPU 52a and programs executed by MPU 52a. Specifically, steps 403 through 417 in FIG. 2 implement the file creation part. Step 419 in FIG. 2 implements the storing part. Steps 453 through 457 in FIG. 4 implements the determination part. Steps 459 through 461 in FIG. 4 implement the additionally write request part. However, the present invention is not limited to the implementation. The above-mentioned embodiment is described for just illustration and explanation. Also, a portion or all of the functional components implemented by the programs may be configured as hardware.

On the other hand, steps 403 through 409 in FIG. 2 implements a first step of an image file creation method according to the first embodiment. Step 411 in FIG. 2 implements a second step of the image file creation method. Steps 413 through 417 implement a third step of the image file creation method. Step 419 implements a fourth step of the image file creation method.

Also, step 453 in FIG. 4 implements a first step of a recording method according to the first embodiment. Steps 455 and 457 implement a second step of the recording method. Steps 459 and 461 implements a third step of the recording method.

In this embodiment, among programs installed in HDD 54, a program to execute the image file creation operation shown in FIG. 2 implements the image file creation program, and a program to execute the image file additionally write operation shown in FIG. 4 implements the image file additionally write program.

According to the first embodiment, when the host 50 is requested to create an image file in order to additionally write user data in an optical disk, MPU 52a executes the image file creation operation. In this image file creation operation, image data of the user data are created, and the disk ID of the optical disk is obtained as identification information. In order to associate the disk ID with the image data, the disk ID is attached to the image data, resulting in the image file. Thus, for example, when the image file is additionally written later, it is possible to identify the additionally writable optical disk without logical inconsistency between the image file and existing data in the optical disk by referring to the disk ID associated with the image file in advance. As a result, it is possible to prevent such logical inconsistency between the image file to be additionally written and existing data in the optical disk.

Furthermore, when the host 50 is requested to additionally write an image file created in the image file creation operation, MPU 52a executes the image file additionally write operation. In the image file additionally write operation, the disk ID of a target optical disk is obtained. Then, the disk ID associated with the image file is obtained, and it is determined whether the disk ID of the target optical disk and the disk ID associated with the image file are the same. Only if these disk IDs are the same, an image file recording request is sent to the optical disk device 20. In other words, the disk ID associated with the image file is referred to before execution of the additionally write operation, and only if the disk ID associated with the image file and the disk ID of the target optical disk are the same, the image file additionally write operation is allowed to be executed. As a result, it is possible to additionally write the image file in the optical disk without logical inconsistency between the image file and existing data in the optical disk.

Although the disk ID is attached to the end portion of an image file in this embodiment, the present invention is not limited to the implementation. It is sufficient that the disk ID is included in the image file.

Also, although the disk ID, which is one of disk specific information items, is used as identification information of an optical disk in this embodiment, the present invention is not limited to the implementation. A disk specific information item other than the disk ID may be used. Furthermore, an information item other than the disk specific information items, for example, session information or track information of the optical disk, may be used.

A second embodiment of the present invention is described with reference to FIG. 5 and FIG. 6. In the second embodiment, track information is used as identification information.

Figure 5:
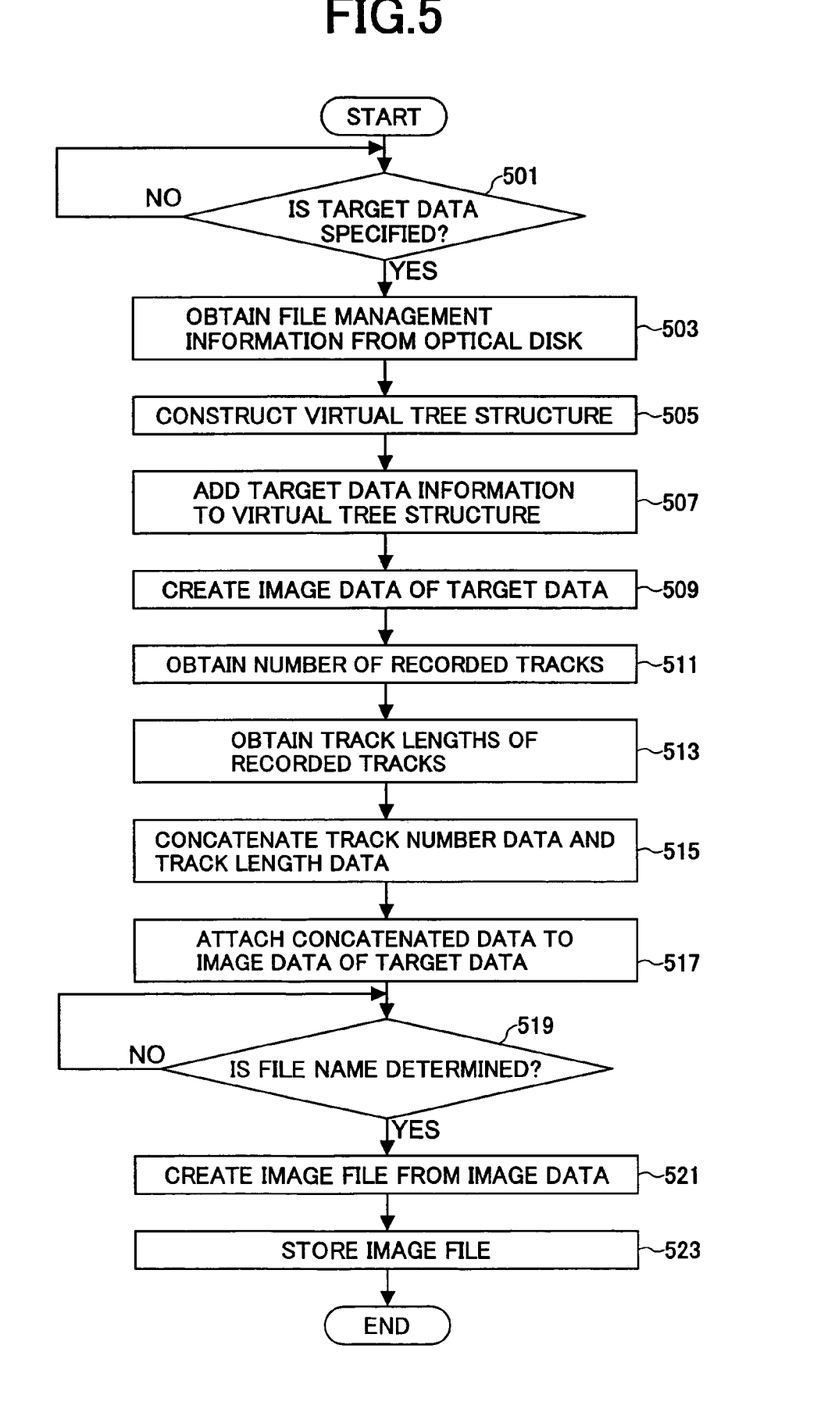
FIG. 5 a flowchart of an image file creation operation according to a second embodiment of the present invention.

FIG. 5 a flowchart of an image file creation operation executed by MPU 52a of the information recording system 10 according to the second embodiment.

Referring to FIG. 5, MPU 52a determines whether target data are specified at step 501 as in step 401. If the target data are not specified, MPU 52a displays on the display device 56 a message to prompt a user to designate the target data. When the user designates the target data via the input device 55, the MPU 52a determines that the target data have been specified, and the process control proceeds to step 503.

At steps 503 through 509, MPU 52a performs the same operation as steps 403 through 409.

At step 511, MPU 52a obtains the number of tracks recorded in the optical disk 15 via the optical disk device 20.

At step 513, MPU 52a obtains the track lengths of individual recorded tracks of the optical disk 15 via the optical disk device 20.

At step 515, MPU 52a concatenates obtained data of the number of recorded tracks and obtained data of track lengths of individual recorded tracks so as to generate identification information on the optical disk 15.

At step 517, MPU 52a attaches the identification information to an end portion of image data of the target data in HDD 54.

At step 519, MPU 52a determines whether the file name of the identification information attached image data of the target data is determined. If the file name is not determined, MPU 52a displays on the display device 56 a message to prompt the user to designate the file name. When the user designates the file name via the input device 55, MPU 52a determines that the file name has been determined, and the process control proceeds to step 521.

At steps 521 and 523, MPU 52a performs the same operation as steps 417 and 419. Then, MPU 52a terminates the image file creation operation.

Figure 6:
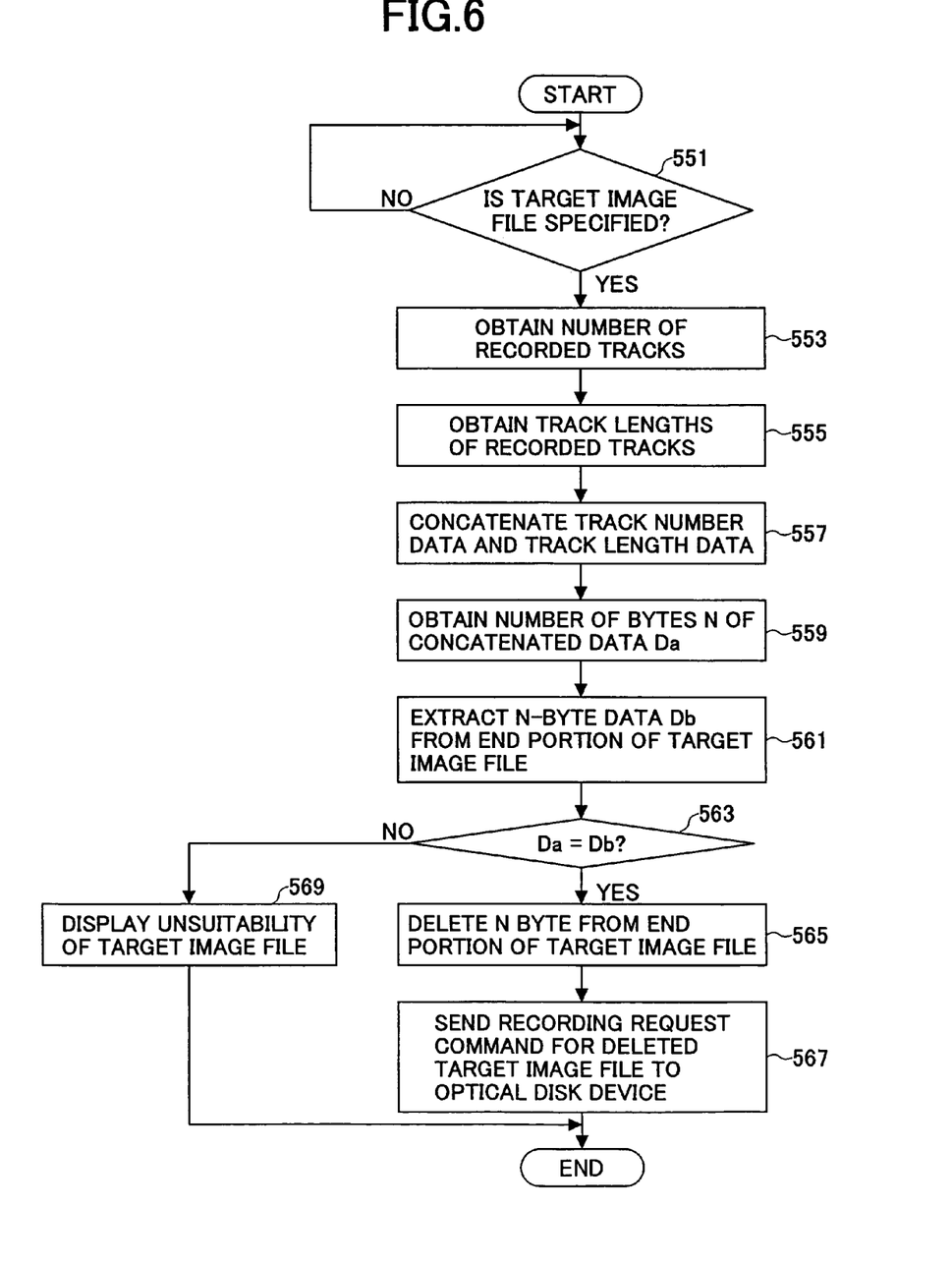
FIG. 6 a flowchart of an image file additionally write operation according to the second embodiment.

FIG. 6 a flowchart of an image file additionally write operation executed by MPU 52a of the information recording system 10 according to the second embodiment of the present invention.

Referring to FIG. 6, MPU 52a determines whether a target image file is specified at step 551 as in step 451. If the target image file is not specified, MPU 52a displays on the display device 56 a message to prompt a user to designate the target image file. When the user determines the target image file from a plurality of image files in HDD 54 and supplies the target image file via the input device 55, MPU 52a determines that the target image file has been specified, and the process control proceeds to step 553.

At step 553, MPU 52a obtains the number of tracks recorded in the optical disk 15 via the optical disk device 20.

At step 555, MPU 52a obtains track lengths of the individual tracks recorded in the optical disk 15 via the optical disk device 20.

At step 557, MPU 52a concatenates the obtained track number data and the obtained track length data to generate concatenated data (Da).

At step 559, MPU 52a obtains the number of bytes N of the concatenated data Da.

At step 561, MPU 52a reads the target image file and extracts N-byte data (Db) from an end portion of the target image file.

At step 563, MPU 52a determines whether the concatenated data Da and the N-byte data Db are the same. If the concatenated data Da and the N-byte data Db are the same, the process control proceeds to step 565.

At step 565, MPU 52a deletes the N-byte data Db from the end portion of the target image file.

At step 567, MPU 52a sends to the optical disk device 20 a recording request command to record the resulting target image file. As a result, it is possible to additionally write the target image file in the optical disk 15 via the optical disk device 20. Then, MPU 52a terminates the image file additionally write operation.

On the other hand, if the concatenated data Da and the N-byte data Db are not the same at step 563, MPU 52a determines that the concatenated data Da and the N-byte data Db are not the same, and the process control proceeds to step 569.

At step 569, MPU 52a displays on the display device 56 a message to indicate that the target image file is not suitable for the optical disk 15 as in step 463. Then, MPU 52a terminates the image file additionally write operation. Thus, the target image file is not additionally written.

In the second embodiment, the number of recorded tracks and the track lengths of the individual recorded tracks are used as track information for identification information. However, other information may be used as the track information.

Alternatively, primary volume descriptor (PVD) information may be used as identification information of an optical disk.

A third embodiment of the present invention is described with reference to FIG. 7 through FIG. 9. In the third embodiment, it is supposed that identification information database is stored in HDD 54 as management information having correspondence between identification information items and image files. For example, the identification information database includes a file name field and an identification information field, as illustrated in FIG. 9A. In this case, it is possible to search records in the identification information database by using the file name as a search key. The illustrated identification information database includes three records.

Figure 7:
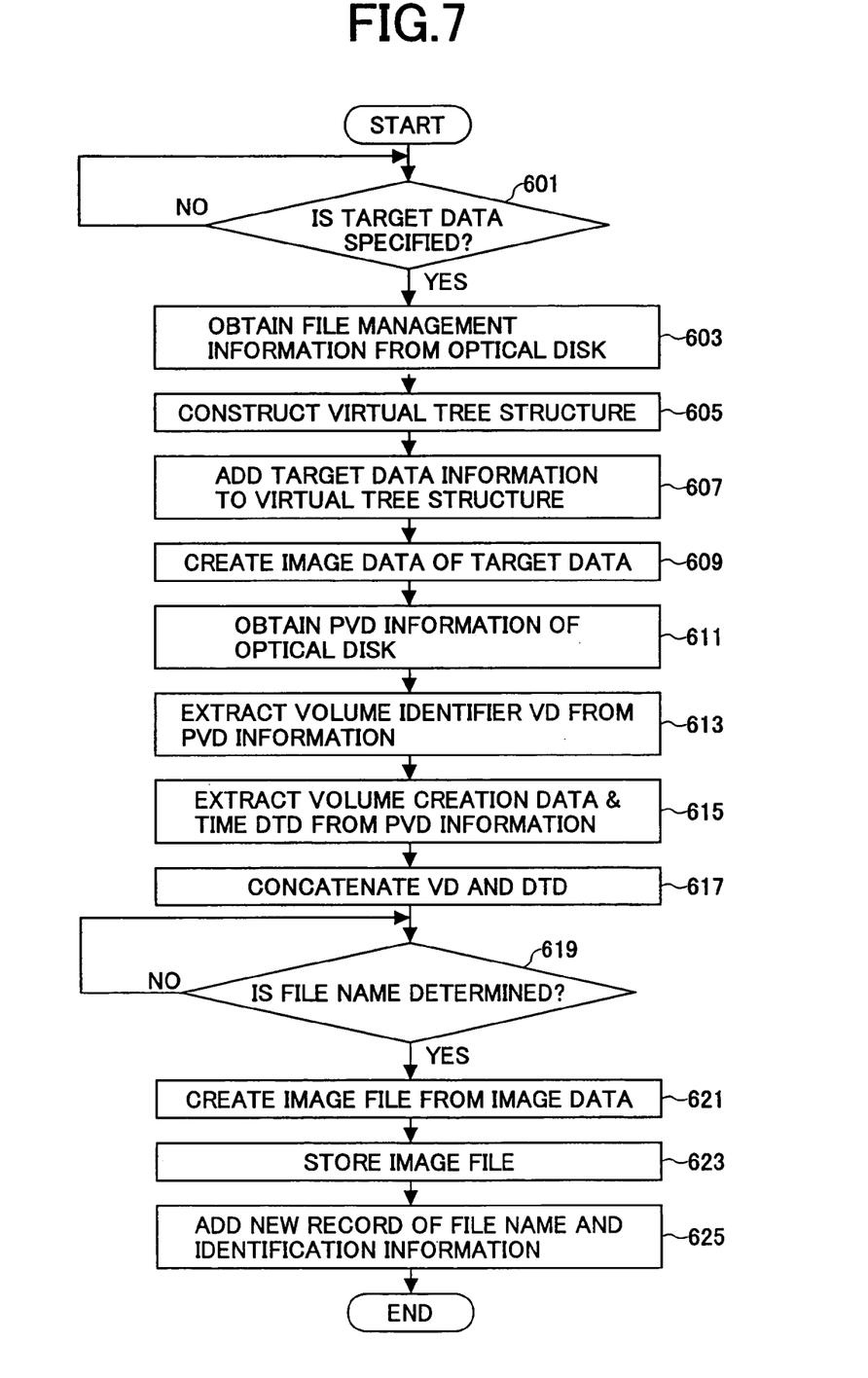
FIG. 7 a flowchart of an image file creation operation according to a third embodiment of the present invention.

FIG. 7 a flowchart of an image file creation operation executed by MPU 52a of the information recording system 10 according to the third embodiment of the present invention.

Referring to FIG. 7, MPU 52a determines whether target data are specified at step 601 as in step 401. If the target data are not specified, MPU 52a displays on the display device 56 a message to prompt a user to designate the target data. If the user designates the target data via the input device 55, the MPU 52a determines that the target data have been specified, and the process control proceeds to step 603.

At steps 603 through 609, MPU 52a performs the same operation as steps 403 through 409.

At step 611, MPU 52a obtains PVD information from a predetermined position in the optical disk 15 via the optical disk device 20.

At step 613, MPU 52a extracts a volume identifier VD (for example, VD=Volume04) from the obtained PVD information.

At step 515, MPU 52a extracts a volume creation data & time DTD (for example, DTD=200301241500) from the obtained PVD information. Here "200301241500" means the data & time "Jan. 24, 2002, 15:00".

At step 617, MPU 52a concatenates the volume identifier VD and the volume creation data & time DTD to generate identification information of the optical disk 15. From the PVD information, it will be understood that the identification information is "Volume04200301241500".

At step 619, MPU 52a determines whether the file name of image data of the target data is designated as in step 415. When the user designates the file name and supplies the file name via the input device 55, MPU 52a determines that the file name has been specified, and the process control proceeds to step 621. In this description, it is supposed that the user designates the file name as "file04".

At step 621, MPU 52a converts the image data of the target data into an image file having the designated file name.

At step 623, MPU 52a stores the image file in HDD 54.

Figure 9A:
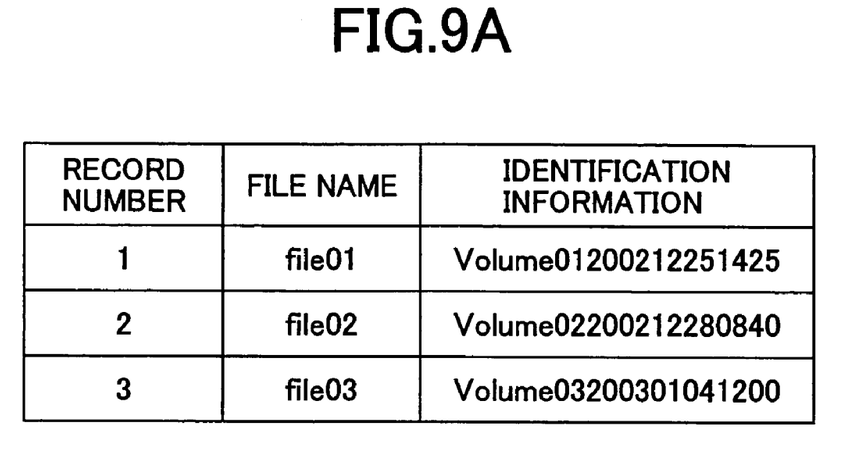
FIGS. 9A and 9B are diagrams to explain identification information database according to the third embodiment.
Figure 9B:
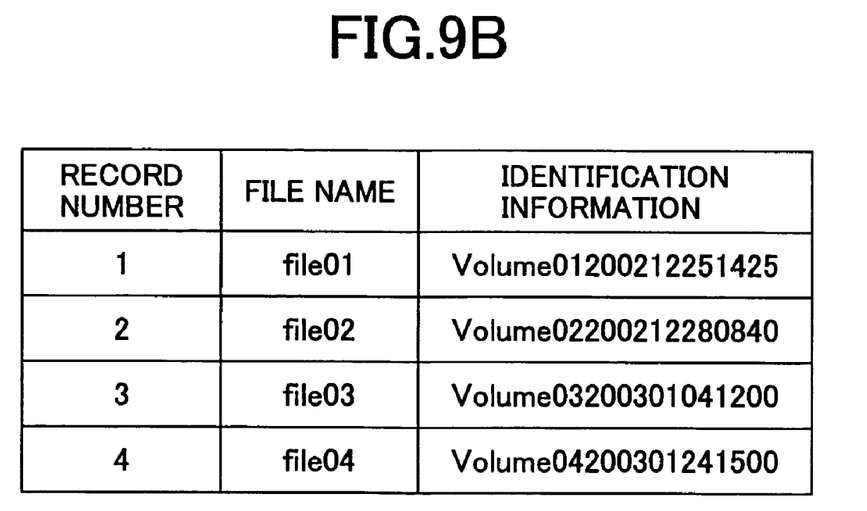

At step 625, MPU 52a adds the identification information and the file name as a new record (record 4) to the identification information database in HDD 54, as illustrated in FIG. 9B. Then, MPU 52a terminates the image file creation operation.

Figure 8:
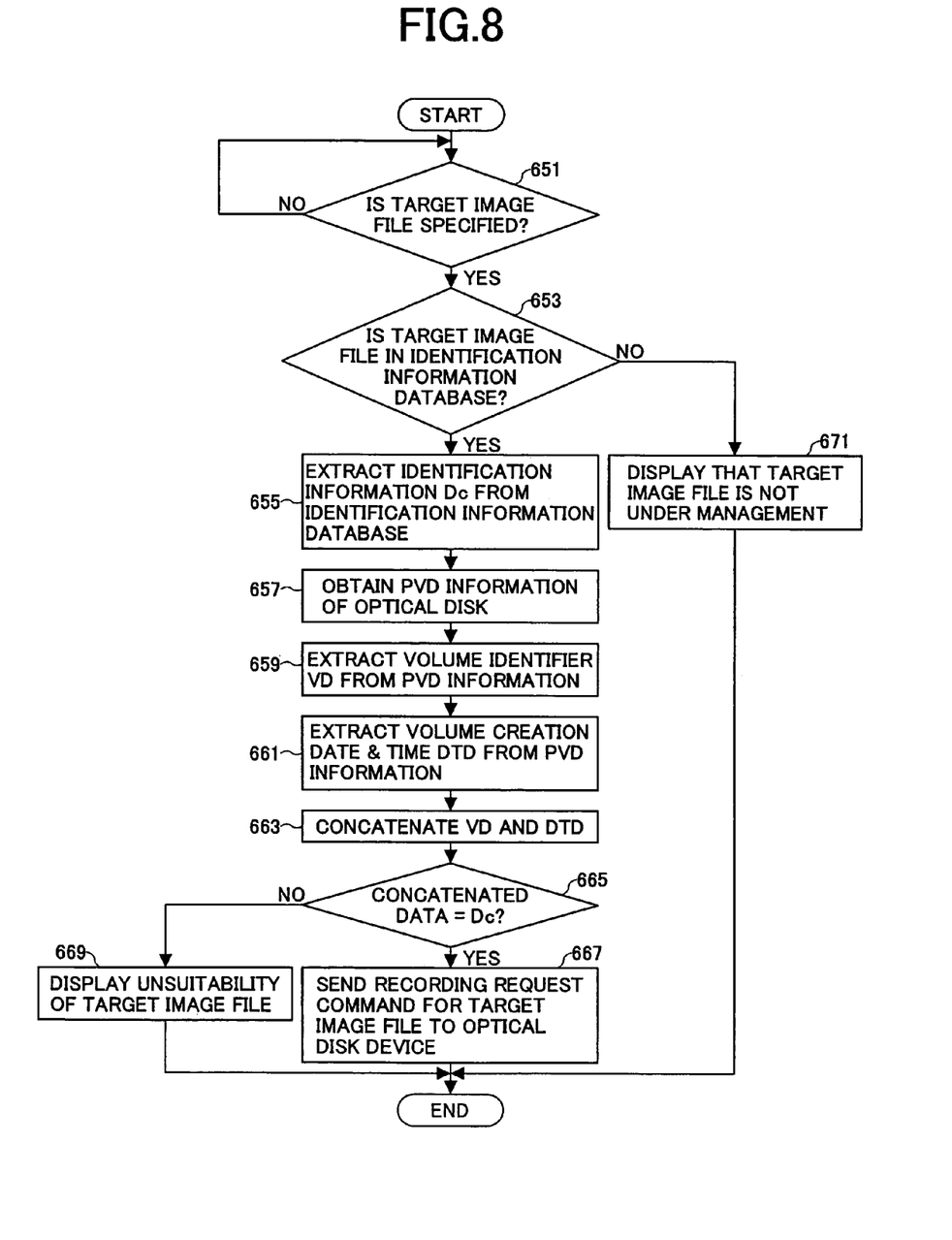
FIG. 8 is a flowchart of an image file additionally write operation according to the third embodiment.

FIG. 8 is a flowchart of an image file additionally write operation executed by MPU 52a of the information recording system 10 according to the third embodiment of the present invention.

Referring to FIG. 8, MPU 52a determines whether a target image file is specified at step 651 as in step 451. If the target image file is not specified, MPU 52a displays on the display device 56 a message to prompt a user to designate the target image file. When the user determines the target image file from a plurality of image files in HDD 54 and supplies the target image file via the input device 55, MPU 52a determines that the target image file has been specified, and the process control proceeds to step 653. In this description, it is supposed that the file name "file04" is specified.

At step 653, MPU 52a searches the identification information database by using the file name "file04" of the target image file as a search key so as to determine whether the corresponding record is in the identification information database. Here, since the corresponding record is included in the identification information database, MPU 52a determines that the corresponding record is included in the identification information database, and the process control proceeds to step 655.

At step 655, MPU 52a extracts identification information Dc "Volume04200301241500" from the corresponding record.

At step 657, MPU 52a obtains PVD information recorded at a predetermined position of the optical disk 15 via the optical disk device 20.

At step 659, MPU 52a extracts the volume identifier VD from the obtained PVD information.

At step 661, MPU 52a extracts the volume creation data and time DTD from the obtained PVD information.

At step 663, MPU 52a concatenates the volume identifier VD and the volume creation data and time DTD so as to generate concatenated data.

At step 665, MPU 52a determines whether the concatenated data and the identification information Dc are the same. If the concatenated data and the identification information Dc are the same, MPU 52a determines that the concatenated data and the identification information Dc are the same, and the process control proceeds to step 667.

At step 667, MPU 52a sends to the optical disk device 20 a recording request command to record the target image file.

As a result, it is possible to additionally write the target image file in the optical disk 15 via the optical disk device 20. Then MPU 52a terminates an image file additionally write operation.

On the other hand, if the concatenated data and the identification information Dc are not the same at step 665, MPU 52a determines that the concatenated data and the identification information Dc are not the same, and the process control proceeds to step 669.

At step 669, MPU 52a displays on the display device 56 a message to indicate that the target image file is not suitable for the optical disk 15 as in step 463. Then, MPU 52a terminates the image file additionally write operation. Thus, the target image file is not additionally written.

On the other hand, if there is no corresponding record at step 653, MPU 52a determines that there is no corresponding record, and the process control proceeds to step 671.

At step 671, MPU 52a displays on the display device 56 a message to indicate that the target image file is not under management. Then, MPU 52a terminates the image file additionally write operation. Thus, the target image file is not additionally written.

In the third embodiment, the volume identifier and the volume creation data and time are used as PVD information for the identification information. However, PVD information other than the volume identifier and the volume creation data and time may be used. Also, the identification information may be attached to the image file as in the disk ID. Also, a disk ID, session information or track information may be used as the identification information instead of or together with PVD information.

Alternatively, at least two of the disk ID, the track information, the PVD information and the session information may be used as identification information.

In the above-mentioned embodiments, the optical disk 15 is configured from CD-R. However, the present invention is not limited to this implementation. The present invention is applicable to any optical disk additionally writable in association with existing data. In addition, the present invention is applicable to a so-called "hybrid disk" including a read-only area and a writable or rewritable area.

Also, in the above-mentioned embodiments, the image file creation program and the image file additionally write program are stored in HDD 54. However, theses programs may be stored in other type recording media such as CD-ROM (Compact Disk-Read Only Memory), a magneto optical disk, a flash memory and a flexible disk. In such a case, a drive device corresponding to each recording medium is provided to install the image file creation program and the image file additionally write program. In other words, it is sufficient that the image file creation program and the image file additionally write program can be loaded into the main memory 52b.

The present invention is not limited to the specifically disclosed embodiments, and variations and modifications may be made without departing from the scope of the present invention.

The present application is based on Japanese Patent Priority Application No. 2002-027044 filed Feb. 4, 2003, the entire contents of which are hereby incorporated by reference.

What is claimed is:

1. A method of additionally writing image data included in an image file in an information recording medium, comprising:
   a first step of obtaining identification information of the information recording medium;
   a second step of determining whether the identification information of the information recording medium and identification information associated with the image file are the same; and
   a third step of, only if the identification information of the information recording medium and the identification information associated with the image file are the same based on the determination, additionally writing the image data included in the image file in the information recording medium.

2. The method as claimed in claim 1, wherein the image file is created in a method of creating an image file of target information to be additionally written in an information recording medium, the method comprising: a first step of creating image data of the target information; a second step of obtaining identification information of the information recording medium; and a third step of creating an image file having the image data in association with the identification information.

3. A program stored in a computer readable medium to cause an information processing device to execute a procedure, the procedure comprising:
   a first step of, in response to a request to create an image file, creating image data of target information to be recorded in an information recording medium;
   a second step of obtaining identification information of the information recording medium;
   a third step of creating an image file having the image data in association with the identification information;
   a fourth step of, in response to a request to additionally write the image file in the information recording medium, obtaining identification information of an information recording medium;
   a fifth step of determining whether the identification information of the information recording medium and the identification information associated with the image file are the same; and
   a sixth step of, only if the identification information of the information recording medium and the identification information associated with the image file are the same based on the determination, additionally writing the image data included in the image file in the information recording medium.

4. A recording medium for storing a program to cause an information processing device to execute a procedure, the procedure comprising:
   a first step of, in response to a request to create an image file, creating image data of target information to be recorded in an information recording medium;
   a second step of obtaining identification information of the information recording medium;
   a third step of creating an image file having the image data in association with the identification information;
   a fourth step of, in response to a request to additionally write the image file in the information recording medium, obtaining identification information of an information recording medium;
   a fifth step of determining whether the identification information of the information recording medium and the identification information associated with the image file are the same; and
   a sixth step of, only if the identification information of the information recording medium and the identification information associated with the image file are the same based on the determination, additionally writing the image data included in the image file in the information recording medium.

5. An information recording system for recording information in an information recording medium, comprising:

an information processing device having a file creation part, in response to a request to create an image file of target information to be additionally written in an information recording medium, creating an image file including image data of the target information in association with identification information of the information recording medium;

an information recording device, in response to a recording request from the information processing device, recording the target information in the information recording medium;

a determination part, in response to a request to additionally write the image file in an information recording medium, determining whether identification information of the information recording medium and the identification information associated with the image file are the same; and an additionally write request part, only if the identification information of the information recording medium and the identification information associated with the image file are the same based on the determination, requesting the information recording medium to additionally write the image file in the information recording medium.

* * * * *